United States Patent Office 3,183,091
Patented May 11, 1965

3,183,091
VESICULAR PHOTOGRAPHIC FILM MATERIAL AND PROCESS FOR UTILIZATION OF SAME
Alfred H. Sporer and Charles E. Allman, San Jose, Calif., assignors to International Business Machines Corporation, New York, N.Y., a corporation of New York
No Drawing. Filed Dec. 29, 1960, Ser. No. 79,179
8 Claims. (Cl. 96—48)

This invention relates to photographic films, their exposure and development. More particularly, the invention relates to films for use in the vesicular image photography art.

Photographic processes are known wherein polymers, such as polyvinylidene chloride, are degraded on exposure to light to form colored polymers having conjugate unsaturation. Other photographic processes, for example, the processes of United States Patents 2,699,292 and 2,911,299, utilize the nitrogen formed by photodecomposition of diazo compounds to form latent images. The latent image is developed in these procedures by heat alone.

We have now discovered photographic films which differ from the conventional diazo sensitized vesicular image forming films in that in our process one quantum of light forms many refractive centers, whereas in processes utilizing diazo sensitized films many quanta of light are required per vesicle.

Essentially, our photographic compositions comprise a polymeric film containing, as the image-forming constituents, a compound which decomposes to form a halogen acid on exposure to light and a second compound which decomposes to form a gas when reacted with a halogen acid.

The halogen acid forming agents useful in the instant photographic film can be polymers such as polyvinyl chloride, polyvinylidene chloride, vinyl chloride-vinylidene chloride copolymers, vinyl chloride-vinyl acetate copolymers, vinylidene chloride-vinyl acetate copolymers, polyvinylidene chloride-acrylonitrile copolymers, and chlorinated rubber. Other organic compounds which readily dehydrodehalogenate when exposed to actinic light include chlorinated paraffins, poly alpha chloroacrylic acid and poly beta chlorostyrene. Other useful compounds include alkyl bromide having not more than six carbons, such as carbon tetrabromide and N-bromo-succinimide. The halogen acid donor compound can be suspended in a spatially stable polymer such as the polyamides, for example, polyhexamethylene adipamide; polyesters such as polyethylene terphthalate; polyester amides, for example, polyhexamethylene adipamide sebacate. Generally, from about 0.2:1 to 10:1 halogen donor to supporting polymer can be utilized where such support is necessary. Alternately, where the halogen donor is a polymer, there is no necessity for a supporting film.

Where desirable, the photosensitive films can be applied to a backing material. Such backing materials are spatially stable and include metal foils, polyesters, polyamides, and polyester amides.

The gas forming reagents utilized in our films include the alkali metal and alkaline earth metal carbonates, bicarbonates, oxalates, and tartrates. Examples of such compounds include magnesium carbonate, sodium bicarbonate and calcium tartrate.

From about 0.1 to about 5% of the gas forming reagent, based on the weight of the halogen acid forming compound, is required to obtain the desired refractive images. Preferably, from about 0.5 to about 1.5% gas forming reagent is included in the films.

The films of our invention are utilized by first exposing the films to short wave light for from about 1 to about 60 seconds and heating the exposed film to a temperature of from about 80 to about 200° C. to develop the desired image. Preferably, the films are exposed from about 10 to about 30 seconds and developed at temperatures of about 100 to 180° C.

The following example more specifically illustrates our invention. It is not intended that our invention be limited to the exact composition shown. Rather, it is intended that all equivalents to those skilled in the art be included within the scope of our invention as claimed.

*Example 1*

A film of Saran F220 (a polyvinylidene chloride-acrylonitrile copolymer) containing potassium bicarbonate in a 100:1 ratio. The film was exposed for 30 seconds at about 8″ distance from Uviarc #2 lamp (G.E.), then heated at about 130° C. for 30 seconds to produce a refractive image.

We claim:
1. A film of material, for forming a vesicular image of refractive centers, consisting essentially of:
   a polymeric polyvinylidene chloride vehicle which, when exposed to light, releases hydrogen chloride; and
   a gas forming compound in an amount not greater than 5% by weight of said polymeric vehicle and selected from the group consisting of alkali metal and alkaline earth metal, carbonates, bicarbonates, oxalates, and tartrates, said gas forming compound being capable of reacting with said hydrogen chloride of the polymeric vehicle to release carbon dioxide gas for producing a multiple of visible bubbles to serve as said refractive centers in said material.
2. The film of claim 1 wherein the gas forming compound is present in an amount from about 0.5 to about 1.5% by weight of the polymeric vehicle.
3. A photographic film consisting essentially of a polymeric polyvinylidene chloride vehicle, and a gas forming compound comprising from about 0.1 to about 5% potassium bicarbonate, based on the weight of said polymeric vehicle.
4. A method of forming a vesicular image of refractive centers in a film of material, said material consisting essentially of a polymeric chlorinated hydrogen containing vehicle and a gas forming compound in an amount not greater than 5%, by weight of said polymeric vehicle, and selected from the group consisting of alkali metal and alkaline earth metal carbonates, bicarbonates, oxalates, and tartrates, said method comprising:
   selectively exposing said material to short-wave light to cause, in said exposed areas, a release of hydrogen chloride from said polymeric vehicle; and
   developing said exposed area by heating said material to a temperature in a range from about 80° C. to about 200° C. and effective only to enhance a reaction between said gas forming compound and said hydrogen chloride of said polymeric vehicle, thereby producing only in the exposed areas carbon dioxide gas which causes the formation of visible bubbles in the exposed areas to serve as said refractive centers.
5. The method of claim 4 wherein the film is exposed to light from about one to about 60 seconds and developed at temperatures of from about 100 to about 180° C.
6. The method of claim 4 wherein the film is exposed to light from about 10 to about 30 seconds and developed at temperatures of from about 100 to about 180° C.
7. A method of forming a vesicular image of refractive centers in a film of material, said material consisting essentially of a polymeric chlorinated hydrogen containing vehicle selected from the group consisting of polyvinyli- dene chloride, vinyl chloride-vinylidene chloride copolymer, vinylidene chloride-vinyl acetate copolymer, vinylidene chloride-acrylonitrile copolymer, chlorinated paraffin, poly alpha-chloroacrylic acid, and poly beta-chlorostyrene, and a gas forming compound selected from the group consisting of alkali metal and alkaline earth metal carbonates, bicarbonates, oxalates, and tartrates, said method comprising:

selectively exposing said material to actinic light to cause, in said exposed areas, a release of hydrogen chloride from said chlorinated hydrogen containing compound; and developing said exposed areas by heating said material to a temperature in a range from about 80° C. to about 200° C. and effective only to enhance a reaction between said released hydrogen chloride and said gas forming compound, thereby producing, only in the exposed areas, carbon dioxide gas which causes the formation of visible bubbles in the exposed areas to serve as said refractive centers.

8. A method of forming a vesicular image of refractive centers in a film of material, said material consisting essentially of a polymeric polyvinylidene chloride vehicle, and a gas forming compound comprising potassium bicarbonate, said method comprising:

selectively exposing said material to ultraviolet light to cause, in said exposed areas, a release of hydrogen chloride from said polyvinylidene chloride; and developing said exposed areas by heating said material to a temperature not greater than about 130° C. and effective only to enhance the reaction between said released hydrogen chloride and said potassium bicarbonate, thereby producing, only in the exposed areas, carbon dioxide gas which causes the formation of visible bubbles in the exposed areas to serve as said refractive centers.

References Cited by the Examiner

UNITED STATES PATENTS

| | | | |
|---|---|---|---|
| 1,932,889 | 10/33 | Groff | 260—45.7 |
| 1,950,440 | 3/34 | Jacobson | 260—45.7 |
| 2,046,986 | 7/36 | Winkelmann | 260—45.7 |
| 2,099,297 | 11/37 | Clement | 96—48 |
| 2,364,410 | 12/44 | Whittaker | 260—45.7 |
| 2,387,571 | 10/45 | Fikentscher et al. | 260—45.7 |
| 2,772,159 | 11/56 | Elliott | 96—115 X |
| 2,779,062 | 1/57 | Stasny | 260—2.5 |
| 2,911,299 | 11/59 | Baril et al. | 96—75 X |
| 3,032,414 | 5/62 | James et al. | 96—91 |
| 3,042,518 | 7/62 | Wainer | 96—98 |

FOREIGN PATENTS

| | | |
|---|---|---|
| 602,312 | 5/48 | Great Britain. |
| 622,511 | 5/49 | Great Britain. |

OTHER REFERENCES

Schildknecht: Vinyl and Related Polymers, John Wiley & Sons, Inc., New York, 1952, pages 421–425 and 451–452.

NORMAN G. TORCHIN, *Primary Examiner.*

HAROLD N. BURSTEIN, *Examiner.*